US009652552B2

(12) United States Patent
Goldman et al.

(10) Patent No.: US 9,652,552 B2
(45) Date of Patent: May 16, 2017

(54) DIALOG SERVER (75) Inventors: Brent Justin Goldman, San Francisco, CA (US); Naitik Hemant Shah, Mountain View, CA (US); Wei Zhu, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 420 days.

(21) Appl. No.: 12/967,377

(22) Filed: Dec. 14, 2010

(65) Prior Publication Data
US 2012/0150941 A1    Jun. 14, 2012

(51) Int. Cl.
| G06F 15/16 | (2006.01) |
| G06F 15/173 | (2006.01) |
| G06F 17/30 | (2006.01) |
| G06F 9/44 | (2006.01) |
| G06Q 50/00 | (2012.01) |
| G06F 9/445 | (2006.01) |

(52) U.S. Cl.
CPC ........ G06F 17/3089 (2013.01); G06F 9/4443 (2013.01); G06Q 50/01 (2013.01); G06F 9/44505 (2013.01)

(58) Field of Classification Search
CPC ......... H04L 67/02; H04L 67/04; H04L 67/14; H04L 67/34; H04L 67/289; H04L 67/2814; H04L 67/325; H04L 67/1008; H04L 69/329; H04L 12/1818; G06Q 30/02; G06Q 30/0267; G06Q 30/0277; G06Q 30/06; G06Q 30/0601; G06Q 30/0603; G06Q 50/01
USPC ................. 709/203–204, 206, 224, 228–229
See application file for complete search history.

(56) References Cited

U.S. PATENT DOCUMENTS

| 5,774,725 | A * | 6/1998 | Yadav ................ G06F 11/3696 714/E11.208 |
| 7,024,348 | B1 * | 4/2006 | Scholz ....................... G06F 8/38 703/24 |
| 7,406,664 | B1 * | 7/2008 | Morton et al. ................. 715/809 |
| 7,552,053 | B2 * | 6/2009 | Gao ........................ G10L 15/26 704/258 |
| 7,865,931 | B1 * | 1/2011 | Stone et al. ....................... 726/1 |
| 2002/0198719 | A1 * | 12/2002 | Gergic .................... G10L 15/22 704/270.1 |
| 2004/0073431 | A1 * | 4/2004 | Galanes ................ G06F 9/4443 704/270.1 |
| 2005/0055702 | A1 * | 3/2005 | Kopp .................... H04W 4/001 719/320 |
| 2005/0091059 | A1 * | 4/2005 | Lecoeuche ........ H04M 1/72561 704/270.1 |

(Continued)

*Primary Examiner* — Farzana Huq
(74) *Attorney, Agent, or Firm* — Baker Botts L.L.P.

(57) ABSTRACT

In one embodiment, a dialog server comprising: a memory comprising instructions executable by one or more processors; and the one or more processors coupled to the memory and operable to execute the instructions, the one or more processors being operable when executing the instructions to: receive, from a client, a request for a dialog and one or more parameters associated with the request; process the request and the one or more parameters to extract information concerning the dialog; generate, based on the information concerning the dialog, code that implements one or more functionalities supported by the dialog, wherein the code can be processed directly by a web browser executing on the client; and transmit, to the client, the code for execution in the web browser.

21 Claims, 6 Drawing Sheets

(56) References Cited

U.S. PATENT DOCUMENTS

| | | | |
|---|---|---|---|
| 2006/0095860 A1* | 5/2006 | Wada et al. | 715/771 |
| 2006/0101392 A1* | 5/2006 | Isaza | G06F 8/38 717/108 |
| 2006/0195588 A1* | 8/2006 | Pennington et al. | 709/227 |
| 2006/0253799 A1* | 11/2006 | Montroy | G06F 17/3089 715/809 |
| 2008/0208979 A1* | 8/2008 | Vishwanath et al. | 709/206 |
| 2008/0313606 A1* | 12/2008 | Poi et al. | 717/107 |
| 2009/0132994 A1* | 5/2009 | Doggett et al. | 717/106 |
| 2011/0283215 A1* | 11/2011 | Dunn | G06F 9/4443 715/771 |

\* cited by examiner

DIALOG SERVER

TECHNICAL FIELD

The present disclosure generally relates to user interfaces of web-based software applications and more specifically relates to a dialog server that provides, to clients, a server-side software library that contains code for automatically constructing user-facing dialogs at runtime, which may be displayed on the clients.

BACKGROUND

In the context of computer programming, a user interface of a software program is where interactions between a human user of the program and the program occur. Typically, the user interface of a program may include various components, such as windows, panels, menu bars, menus, menu items, buttons, text fields, check boxes, dialogs, etc., and particular user-interface components may be arranged according to specific designs suitable to the requirements, specification, or functionalities of the program. The user interface, via individual user-interface components, enables the human user to provide input to the program (e.g., entering text in a text field, selecting a menu item, or clicking a button), and displays the output of the program to the human user (e.g., showing a message in a dialog, or playing a video clip in a media panel).

Both web-based and standalone software applications may and usually do have user interfaces. A web-based application is a software application that is executed within a web browser (including browsers suitable for computers and mobile devices). Typically, a web-based application may be associated with a unique Uniform Resource Identifier (URI), such as in the form of a Uniform Resource Locator (URL). To invoke a web-based application, a user may input the URL of the web-based application in a web browser. For example, a social networking website, such as the one provided by Facebook®, may provide a web-based application that enables its users to stay in touch with their friends and families, play Internet games, and managing personal schedules. In this case, to invoke the web-based application, a user may input the URL "www.facebook.com" in a web browser executing on a network device (e.g., a computer or a mobile telephone). The user interface of the application includes a set of web pages that may be individually displayed in the user's web browser. For example, upon invoking the application, initially, a login/sign up page may be presented to the user so that the user may either log into his existing account or sign up for a new account. Once the user has successfully logged in, a welcome page (e.g., the home page of the user's account) may be presented to the user from where the user may perform other activities and interact with the application (e.g., communicating with friends, uploading photos, playing Internet games, or managing the user's profile).

SUMMARY

The present disclosure generally relates to user interfaces of web-based software applications and more specifically relates to a dialog server that provides, to clients, a server-side software library that contains code for automatically constructing user-facing dialogs at runtime, which may be displayed on the clients.

Particular embodiments provide a dialog library residing on a dialog server. The dialog library may implement one or more types of dialogs, and each type of dialog may be included as a component of a user interface of a web-based software application. The dialog library may support any number of web-based applications executing within web browsers, including mobile browsers, running on computing devices.

In particular embodiments, when a web-based application executing within a web browser needs to display a dialog, the web-based application causes a request to be sent to the dialog library together with information describing the dialog. The dialog library processes the request, generates appropriate code that may be processed and interpreted by the web browser, and transmits the generated code to the web browser. The web browser may then process the code to display the dialog.

These and other features, aspects, and advantages of the disclosure are described in more detail below in the detailed description and in conjunction with the following figures.

DESCRIPTION OF EXAMPLE EMBODIMENTS

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A user interface of a software application may include various components, one of which may be dialogs. A dialog is a very versatile user-interface component because it may be used in many situations, especially when an application needs to communicate with its user or request a user input, and because it may be presented in many ways. For example, a dialog may be presented in a window or a web page by itself, in a popup window, or as a part of a window or a web page (e.g., using the "<iframe>" tag) that also includes other content. A dialog may be displayed on any type of display device, such as computer monitors or mobile device screens. A dialog may be used to convey any message or notification to a user or to request any input from a user.

Figure 3A:
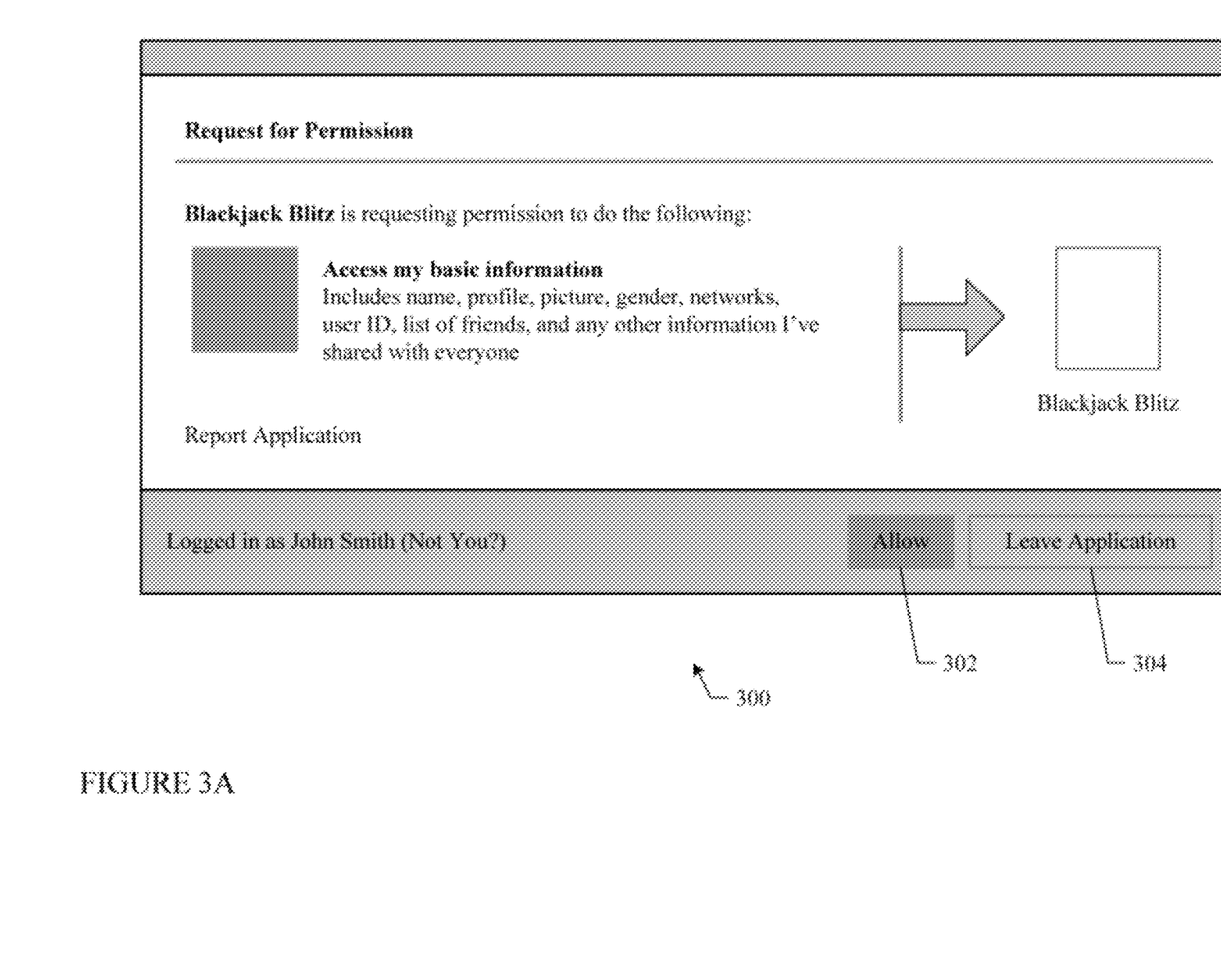
FIG. 3A illustrates an example "permission" dialog.

FIG. 3A illustrates an example dialog 300, which may be displayed in a web page or a pop-up window. Dialog 300 is used for requesting a user's permission to allow an application, in this case, a game application called "Blackjack Blitz", to access some of the user's information (e.g., the information the user has chosen to share with the general public). Dialog 300 includes two buttons, 302 and 304. If the user agrees to grant access permission to the application, the user may click on button 302. Otherwise, if the user does not want to grant access permission to the application, the user may click on button 304.

Because dialogs may be used for different purposes and in different ways, there are many types of dialogs. In fact, in practice, a software application may use a large number of different types of dialogs at different times, each having its own parameter names, output format, layout design, behavior, functionalities, and callback functions. Consequently, when developing such an application, code needs to be written for each and every type of dialog used in the application, which may be very time consuming. Furthermore, if there are bugs (i.e., errors) in the dialog code, the code for each and every type of dialog, including both different types of dialogs as well as the same dialog running in multiple display contexts, may need to be debugged separately, which, again, may be very time consuming.

To alleviate such burdens on the software programmers, particular embodiments provide a dialog library, which may reside on a server, and more specifically, on a dialog server. In particular embodiments, a dialog server may be a unitary server or may be a distributed server spanning multiple computers or multiple datacenters. A dialog server may include hardware, software, or embedded logic components or a combination of two or more such components for carrying out the appropriate functionalities implemented or supported by the dialog server. In particular embodiments, a dialog library may include code that supports different types of dialogs. The code may be written using any suitable computer programming language, such as C, C++, Java, or PHP. If needed, the code may be compiled using a suitable compiler into machine code. In particular embodiments, the code may be organized into objects such as functions, procedures, methods, or classes (e.g., according to the object-oriented programming methodology), and these objects may be invoked locally or remotely through appropriate protocols or programming interfaces. The dialog library may be available to any web-based applications executing on any computing devices that are communicatively linked to the dialog server via any networks.

Suppose a web-based application uses various types of dialogs for different purposes. Instead of writing separate code for each and every type of dialog used in the web-based application, the programmers of the application may take advantage of the dialog library residing on a dialog server. In particular embodiments, when a specific dialog needs to be displayed to a user, the corresponding code of the application, when executed in a web browser on a computing device, may cause a request to be sent to the dialog server together with the necessary information describing the desired dialog. The dialog server, upon receiving such a request, may invoke the appropriate objects (e.g., methods or functions) in the dialog library to generate code in a language, such as HTML (HyperText Markup Language), XML (Extensible Markup Language), or JavaScript, that may be interpreted by a web browser and transmit the code to the computing device so that the web browser running on the computing device may interpret the code to display the dialog.

Figure 1:
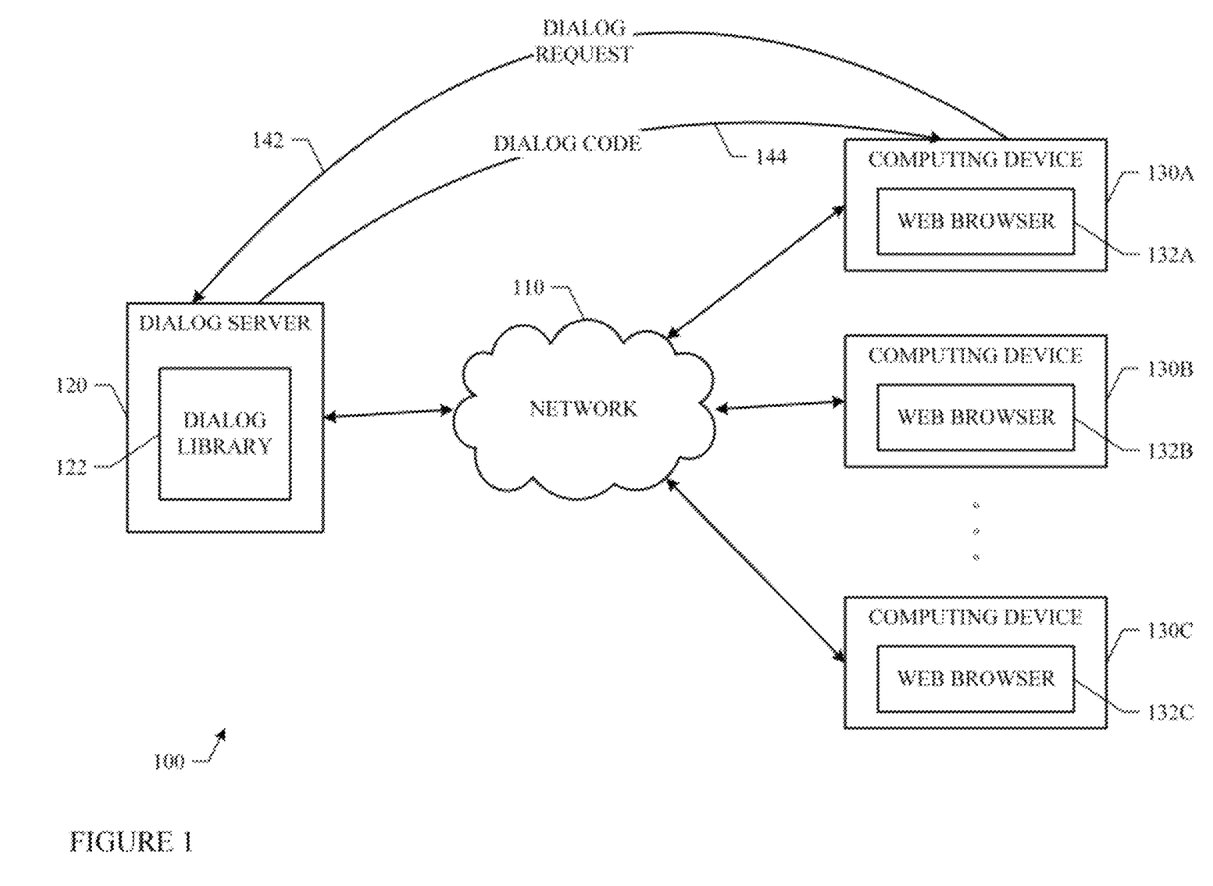
FIG. 1 illustrates an example system that includes a dialog server.

FIG. 1 illustrates a system 100 that includes a dialog server 120 and any number of computing devices 130A, 130B, 130C. In particular embodiments, dialog server 120 and computing devices 130A, 130B, 130C are each linked, communicatively, to a network 110, which may be any type of communication network such as the Internet, an intranet, or a wireless network. In particular embodiments, a dialog server may support any number of computing devices. In particular embodiments, each computing device 130A, 130B, 130C may transmit dialog requests to dialog server 120 via network 110. Similarly, dialog server 120 may transmit code generated in response to the dialog requests to each computing device 130A, 130B, 130C.

In particular embodiments, dialog server 120 may include a dialog library 122 that contains the code implementing the functionalities that support various types of dialogs, including the code that, when executed, causing, for example, one or more processors of dialog server 120 to process dialog requests received from computing devices 130A, 130B, 130C, generate code that may be interpreted by web browsers for displaying the requested dialogs, and transmit the generated code to the requesting computing devices 130A, 130B, 130C. In particular embodiments, dialog library 122 may be implemented as computer software and stored in computer-readable, non-transitory, and tangible medium, which may be a part of dialog server 120. When the software is executed, it may cause dialog server 120 and more specifically, one or more processors of dialog server 120 to perform various functions supported by the software.

In particular embodiments, each computing device 130A, 130B, 130C includes a web browser 132A, 132B, 132C. In particular embodiments, a web-based application may be executed within web browsers 132A, 132B, 132C. The user interface of the web-based application, including dialogs, may be displayed via web browsers 132A, 132B, 132C.

For example, suppose that a web-based application is executed in web browser 132A, which is running on computing device 130A. Further suppose that at some point during the execution of the web-based application, a specific dialog needs to be displayed. In particular embodiments, for displaying the dialog, the web-based application may include code that, when executed in web browser 132A, causes a request 142 to be sent from computing device 130A to dialog server 120. Dialog request 142 may be sent through network 110 using a predetermined protocol and may include information describing the requested dialog. In particular embodiments, upon receiving dialog request 142, the appropriate code in dialog library 122 may be invoked to process dialog request 142 in order to, for example, determine the type of dialog being requested and the associated parameters. Based on the information determined from dialog request 142 about the requested dialog, code for displaying the dialog in a web browser may be generated. In addition, code for supporting the functionalities of the dialog may be generated. In particular embodiments, the generated code may be written in a language that may be interpreted by web browser, such as HTML, XML, JavaScript, or any suitable client-side scripts. The generated dialog code 144 may then be transmitted from dialog server 120 to computing device 130A. Upon receiving dialog code 144, web browser 132A may process and interpret dialog code 144 to display the requested dialog.

The code contained in a dialog library may be written in any suitable programming language. Particular embodiments may write the code contained in a dialog library in the PHP programming language and provide an Application Programming Interface (API) for the dialog library, which defines the specific classes and methods available in the dialog library so that they may be used by software programmers when developing web-based applications. In particular embodiments, the dialog library may include a PHP class named "ApiUIBase" as a parent class for all types of dialogs. Each different type of dialog may be implemented as a separate PHP class, extending class "ApiUIBase". Each PHP class that implements a specific type of dialog may include any number of public, private, and/or static methods that support different functionalities of the dialog.

In particular embodiments, there are several types of dialogs that are supported by the dialog library. The following is a sample list of the types of dialogs that may be supported by a dialog library and the PHP classes that implement these types of dialogs. These types of dialogs may be suitable for a web-based social networking application. For example, the "login" dialog may be used to ask a user for his username and password so that the user may log into his account at a social networking website supported by the web-based social networking application. The social networking website may provide additional applications either itself or through third-party partners. For example, at the website "www.facebook.com", after a user logs into his account, he may play computer games, such as "FarmVille", "Mafia Wars", or "Café World", provided by a third-party partner named Zynga®. The "permission" dialog may be used to grant such applications data and other types of permissions, and the "bookmark" dialog may be used to ask a user whether he wishes to bookmark a specific application to appear on the bookmarks list on the Facebook homepage.

SAMPLE PREDEFINED DIALOG TYPES IN A DIALOG LIBRARY

| Dialog Name | Method | PHP Class | Description |
| --- | --- | --- | --- |
| login | login.identifier | LoginApiUI | Prompts a user for a username and password, and logs the user in. |
| permission | permissions.request | PermissionsReqeustApiUI | Promps a user to grant an application data permissions and extended permissions. |
| stream | stream.publish | StreamPublishApiUI | Promps a user to oublish a feed story. |
| bookmark | bookmark.add | BookmarkApiUI | Prompts a user to bookmark an application. |
| profiletab | profile.addTab | ProfileAddtabApiUI | Prompts a user to add an application as a profile tab. |
| addfriend | friends.add | FreidsAddApiUI | Prompts a user to send a friend request to another user. |
| optin | opt.in | OptInApiUI | Prompts a user to opt into Platform if he has previously opted out. |
| create_app | create.app | CreatAppApiUI | Prompts a user to create an application. |
| share | share.page | ShareApiUI | Prompts a user to share a page on his wall or via a private message. |
| like | like.object | LikeApiUI | Prompts a user to like an object. |

In addition to the types of dialogs supported by the dialog library, particular embodiments allow software programmers to define and implement any additional types of dialogs. Each additional type of dialog may be implemented as a PHP class, extending the parent dialog class "ApiUIBase". Once the PHP classes are implemented, they may be included in the dialog library or organized into another library residing on other servers and made available to software programmers developing web-based applications.

The following SAMPLE CODE 1 illustrates an example of implementing a particular type of dialog using a PHP class named "StreamPublishApiUI".

SAMPLE CODE 1: A PHP CLASS IMPLEMENTING A DIALOG

```
1    class StreamPublishApiUI extends ApiUIBase {
         // returns the display contexts this dialog
         // supports
2        public static function getDisplayContexts( ) {
3            return array('iframe', 'page', 'popup');
4        }
     // returns the custom parameters and their
     // corresponding types that are accessible to
     // outside developers. that is, developers can
     // pass these parameters to the initial
     // invocation of a dialog server
5        public static function getParamNames( ) {
6            return array_merge(
7                parent::getParamNames( ),
8                self::getInternalParamNames( ),
9                array('target_id' => new UidParam( ),
10                   'message' => new AnythingParam( )));
11       }
     // returns the custom parameters and their
     // corresponding types that are not accessible
     // to outside developers. if developers pass
     // these parameters to the initial invocation
     // of the dialog server, they will be stripped.
     // This prevents developers from auto-confirming
     // a dialog by passing confirm_clicked=1
12       public static function getInternalParamNames( ) {
13           return array_merge(
14               parent::getParamNames( ),
15               self::getInternalParamNames( ),
16               array('publish_clicked' => null,
17                   'cancel_clicked' => null));
18       }
     // returns the context checks
19       public static function getChecks( ) {
20           return array_merge(parent::getChecks( ),
21               array(new StreamPrivacyCheck( ));
22       }
     // the dialog controller
23       public function execute( ) {
         // this is how to access parameters
24           $target_id = $this->data->param('target_id');
25           $message = $this->data->param('message');
         // this is how to log
26           $this->log('stream_dialog_impression',
27               array('target_id' => $target_id,
28                   'message' => $message));
         // do whatever data fetching needed
29           $my_data = fetch_stream_data($);
         // handle errors
30           if (some_error_condition($my_data)) {
```

SAMPLE CODE 1: A PHP CLASS IMPLEMENTING A DIALOG

```
            // if $this->kError or $this->errorMsg
            // is set, a red error box appears at
            // the top of the dialog
31          $this->kError =
32              kError_SomethingBadHappened;
33          }
            // isFromPost lets one know if this is the
            // result of a user clicking a button on a
            // previous dialog or not
34          if (!$this->kError && !$this->errorMsg &&
35              $this->data->isFromPost( )) {
36              if ($this->data->param(
37                  'publish_clicked')) {
                    // publish the post
38                  $success =
39                      publish_stream_post($target_id,
40                                          $message);
                    // this is how to close a dialog
41                  $this->closeDialog(
42                      array('success' => $success));
43              } else if ($this->data->param(
44                  'cancel_clicked')) {
45                  $this->closeDialog(
46                      array('success' => 0));
47              }
48          }
49      }
        // this function gets called if execute( )
        // doesn't call $this->closeDialog( ).
        // It's the display controller.
50      public function prepareDialog( ) {
            // get the base dialog object.
            // This is where the display boilerplate
            // magic happens.
51          $dialog = UIPlatformDialogFactory::getDialog(
52              $this->data);
            // set the dialog's content area
53          $content = <fb:stream-publish-form />
54          $dialog->setContent($content);
            // set the title
55          $dialog->setTitle(fbt('Publish to Stream'));
            // add some buttons (the third param is
            // <ui:button>'s "use" parameter.
            // It can be special (green),
            // confirm (blue), or default (grey).
56          $dialog->addButton('publish_clicked',
57              fbt('Publish'), 'confirm');
58          $dialog->addButton('cancel_clicked',
59              fbtc('Cancel'), 'default');
            // maybe set a footer (showed to the left
            // of the buttons
60          $dialog->setFooter('free ringtones');
            // and return
61          return $dialog;
62      }
63  }
```

In particular embodiments, a dialog may be displayed in different ways and on different devices. For example, a dialog may be displayed on computing and mobile devices. A dialog may be displayed in a web page by itself or as a part of a web page, within a popup window, within another user-interface component, and so on. In particular embodiments, there are several types of display types or display contexts that are supported by the dialog library. Each display type may be defined using, for example, a unique number of string, in the dialog library. The following is a sample list of the dialog display types that may be supported by a dialog library. These display types may be suitable for a web-based social networking application.

SAMPLE PREDEFINED DIALOG DISPLAY TYPES
IN A DIALOG LIBRARY

| Display Type | Description |
|---|---|
| page | Full page view on the user interface of a web-based application. Used with redirects from within a web browser. |
| popup | Web popup. Dialog stands on its own, but in a smaller frame. |
| iframe | Inline iframe dialog. May rely on the outer page to render the border, so the page is very trim. A session key may be required to prevent clickjacking. |
| wap | Customized for poor mobile browsers. No JavaScript, no iframes; very few images and CSS rules, and fits on a very tiny screen. Note that "wap" does not actually refer to the WAP/WML stack. |
| touch | Customized for advanced mobile browsers, like iPhone and Android. Various screen sizes and may count on JavaScript and CSS. |
| async | Used in a custom JavaScript dialog on Facebook.com that is more performant than iframes. Not directly available to outside developers without being proxied. |

In addition to the dialog display types supported by the dialog library, particular embodiments allow software programmers to define and implement any additional dialog display types or contexts. Each additional display type or context may be similarly defined as a unique string or number, and there may be corresponding code supporting the additional display type or context. The code may be included in the dialog library or organized into another library residing on other servers and made available to software programmers developing web-based applications.

In particular embodiments, in the class implementing a specific type of dialog, there may be a method that returns all the display types in which the specific type of dialog may be displayed. For example, in the above SAMPLE CODE at lines 2-4, there is a static method named "getDisplayContexts" that returns all the display types in which the dialog implemented by class StreamPublishApiUI" may be displayed. In this case, the dialog may be displayed as an inline iframe dialog, a popup window, or in a full page. If the dialog may be displayed elsewhere (e.g., in other display contexts), the appropriate display types may be added to the array at line 3. For example, if the dialog may be displayed on mobile devices having mobile browsers, "wap" or "touch" may be added to the list of supported display types. Once these display types are added to the list of supported display types, the dialog server can render this dialog in those contexts with no extra work on the part of the dialog developer.

A dialog may have any number of parameters. For example, with the "login" dialog, there may be parameters relating to a "username" input field, a "password" input filed, and a "submit" button. These parameters may have their own unique names, data types, data restraints, etc. In particular embodiments, in the class implementing a specific type of dialog, there may be one or more methods relating to the parameters of the dialog. For example, in the above SAMPLE CODE at lines 5-11, there is a static method named "getParamNames" that returns the names and types of all the parameters of the dialog that are accessible to outside developers. And at lines 12-18, there is a static method named "getInternalParamNames" that returns the names and types of all the parameters of the dialog that are not accessible to outside developers.

In particular embodiments, in the class implementing a specific type of dialog, there may be a method that invokes the dialog itself. For example, in the above SAMPLE CODE at lines 23-48, there is a public method named "execute" that, when invoked, performs the specific functionalities of the dialog.

In particular embodiments, a dialog library residing on a dialog server (e.g., dialog library 122 residing on dialog server 120) may support dialog requests from any number web browsers executing on any number of computing devices (e.g., web browsers 132A, 132B, 132C executing on computing devices 130A, 130B, 130C respectively). Consequently, a web-based application does not need to include code that implements each and every type of dialog used in its user interface. Instead, the web-based application may take advantage of the dialog library and the dialogs supported by the dialog library. For each time a dialog is needed, the web-based application only needs to include code that requests the dialog from the dialog library.

Figure 2:
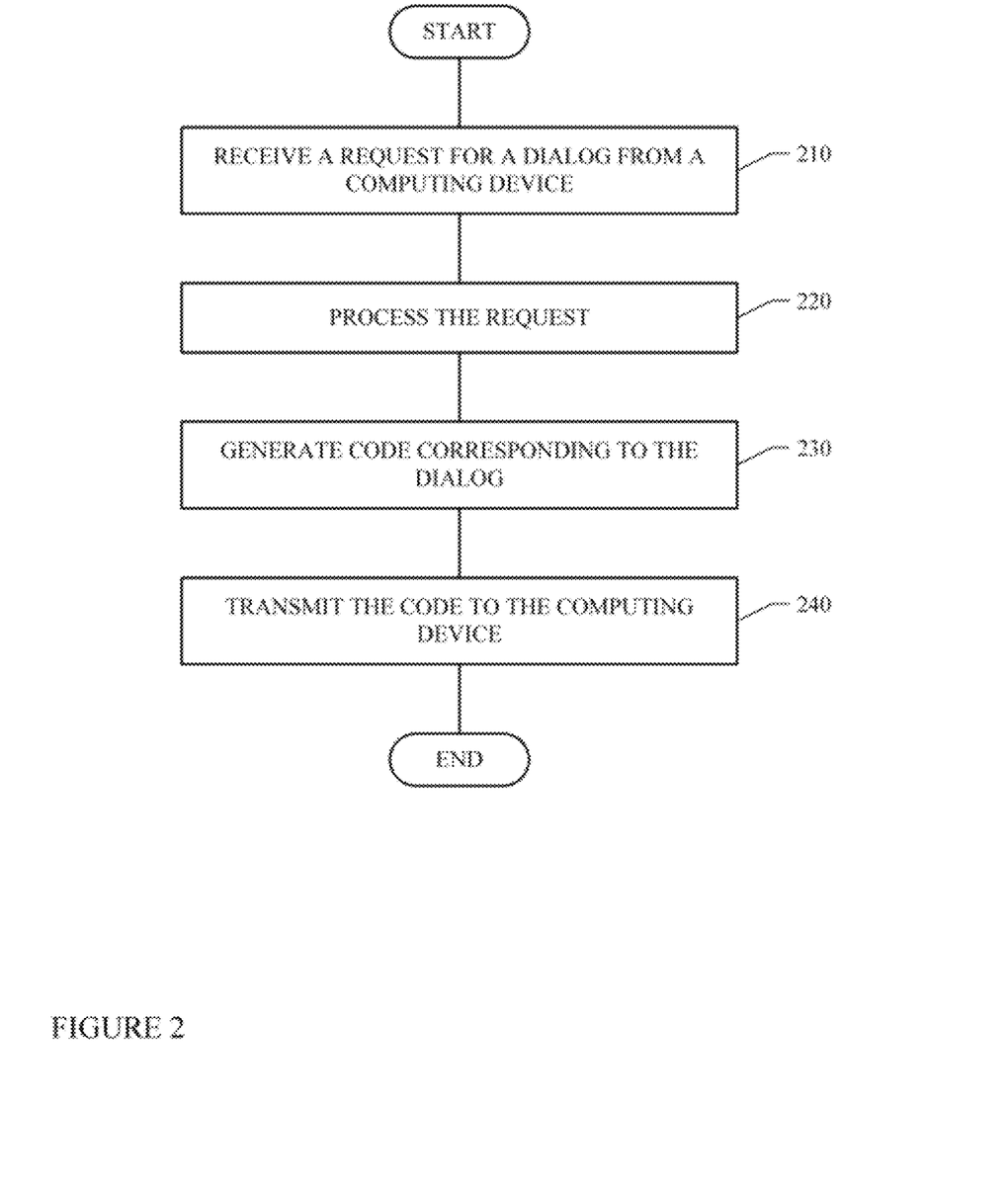
FIG. 2 illustrates an example method for processing a request for a dialog sent from a computing device to a dialog server.

FIG. 2 illustrates an example method for processing dialog requests sent from computing devices to a dialog server. Suppose that a web-based application has a user interface that may use various types of dialogs from time to time. Further suppose that the web-based application is executed in a web browser on a computing device, and at some point, a dialog needs to be displayed. In particular embodiments, the web-based application may include code that, when executed in the web browser, causes a request for the dialog to be sent from the computing device to a dialog server, as illustrated in step 210. The code may be written in a language that may be directly processed by the web browser, such as HTML, XML, JavaScript, or any suitable client-side scripting language. The following SAMPLE CODE 2 illustrates an example request made to the dialog server for a "stream.publish" dialog. SAMPLE CODE 2 is implemented using JavaScript, and may be included, for example, in the source code of specific web pages and executed in the web browsers.

SAMPLE CODE 2: DIALOG REQUEST

```
1   <script>
2   var publish = {
3     method: 'stream.publish',
4     message: 'getting educated about Dialog Server',
5     attachment: {
6       name: 'Dialog Server',
7       caption: 'The Facebook Dialog Server running with display=iframe on the Joey SDK',
8       description: (
9         'Long description of the Dialog Server'
10      ),
11      href: 'http://fbrell.com/',
12      media: [
13        {
14          type: 'image',
15          href: 'http://fbrell.com/',
16          src: 'http://fbrell.com/f8.jpg'
17        }
18      ],
19    },
20    action_links: [
21      { text: 'fbrell', href: 'http://fbrell.com/' }
22    ],
23    user_prompt_message: 'Share your thoughts about Dialog Server'
24  };
```

In particular embodiments, a dialog request may be sent to the dialog server through a communication network using any suitable protocol, such as HTTP (Hypertext Transfer Protocol). The following SAMPLE CODE 3 illustrates an example of the HTTP call to the dialog server for a dialog request:

SAMPLE CODE 3: DIALOG REQUEST

```
http://www.facebook.com/connect/uiserver.php?
   app_id=123456&
   session_key=...&
   Method=stream.publish&
   display=...&
   next=...&
   channel=...&
   sdk=joey&
   param1=...¶m2...&...
```

In this case, the code that implements the dialog request makes a HTTP call to invoke a server-side script written in PHP, which is a general purpose scripting language. The call may be transmitted to the server (e.g., the dialog server) using the HTTP protocol or any suitable communication protocols, and invokes the server-side script code named "uiserver.php". In particular embodiments, the server-side script code (e.g., "uiserver.php") may be a part of the dialog library residing on the dialog server. The HTTP call may also include a number of arguments, which may be passed to the PHP script as input parameters. Some of these arguments are required and some are optional.

More specifically, in SAMPLE CODE 3, "app_id" is the unique identifier of the application making the dialog request, and "session_key" is the platform session key. In particular embodiments, "app_id" is always required, while "session_key" is only required if the dialog is displayed in iframe to combat clickjacking, which is a malicious technique of tricking network users into revealing confidential information or taking control of their network devices while clicking on seemingly innocuous web pages. Alternatively, in particular embodiments, "app_id" and "session_key" may be combined into a single argument named "access_token".

In particular embodiments, "method" is the name of the method associated with the requested dialog and is always required. Each of the sample dialog type described above has a method name, which may be used with this argument.

In particular embodiments, "display" is the display type (e.g., page, popup, or iframe as described above) where the dialog is to be displayed. This argument is optional. If no value is provided, then by default, the dialog is displayed in a web page by itself (i.e., display type is "page").

In particular embodiments, "next" is the URL that dialog server redirects to after the user has taken an action in connection with the dialog and is required. The UR server delivers data back to the web-based application by appending "GET" parameter of the corresponding HTTP call to this URL.

In particular embodiments, "channel" is a URL used for cross-domain communication with available JavaScript SDKs (software development kits), and "sdk" is a SDK that is in communication with dialog server, such as joey, android, or iphone, and primarily used for logging. Both of these arguments are optional.

In particular embodiments, "param4" is a parameter for a particular method. Each method may have one or more parameters and they may be listed in sequence here. The actual parameters of each method are specified in the API of the dialog library.

In particular embodiments, upon receiving the dialog request (e.g., in the format of a HTTP call described above), the dialog library residing on the dialog server may process the request to extract all the arguments received with the HTTP call to determine the type of dialog requested (e.g., from "method"), the application making the request (e.g., from "app_id" or "access_token"), the display type for the dialog (e.g., from "display"), the URL address for redirecting the user action in connection with the dialog (e.g., from "next"), and other optional information, as illustrated in step 220. The appropriate methods of the PHP class that implements the requested dialog may be invoked.

In particular embodiments, the dialog library may include a number of utility classes that implement functionalities that support the processing and handling of dialog requests received from clients. For example, there may be a PHP class in the dialog library named "ApiUIServer", which may be a parent class for the utility classes. There may be a PHP class named "ApiUIParamProcessor", which may include code that processes the parameters sent with a dialog request to extract the individual parameter values (e.g., values for "app_id", "display", and etc.). There may be a PHP class named "ApiUIPreparer", which may include code that prepares a dialog for display at the client, such as instantiating the class that implements the requested dialog, and passing the input parameters to the appreciate methods of the class.

Particular embodiments may then generate code corresponding to the functionalities of the requested dialog, as illustrated in step 230, and transmit the generated code to the computing device that has sent the dialog request. In particular embodiments, the generated code may be written in any suitable language that may be directly processed and interpreted by a web browser, such as HTML, XML, JavaScript, or any suitable client-side scripting language. The generated code, when executed in a web browser, may cause the requested dialog to be displayed in the specified display context (e.g., iframe, popup, etc.) and support the functionalities of the requested dialog. Upon receiving the generated code from the dialog server, the web browser on the computing device may process the code to display the dialog and continue execution of the web-based application. An example of the HTML code generated in response to a request for a "stream.publish" dialog is illustrated in APPENDIX A. In addition, an example of the "publish" dialog implemented by the HTML code illustrated in APPENDIX A is illustrated in FIG. 3B.

Figure 3B:
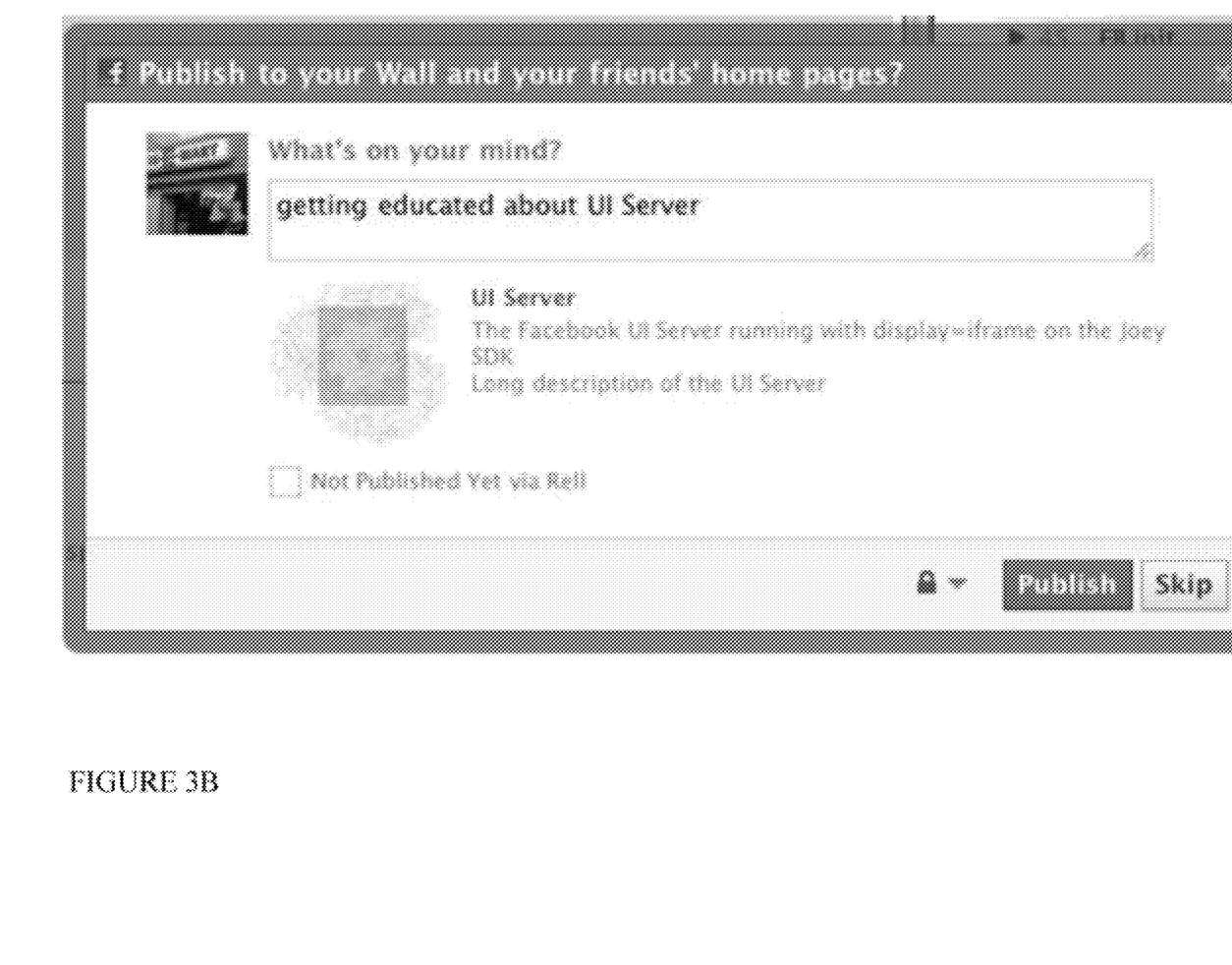
FIG. 3B illustrates an example "publish" dialog.

As illustrated in FIGS. 3A and 3B, a dialog often includes various user-interface components, such as text fields, buttons, check boxes, etc. Thus, the code generated by the dialog server for a dialog may include code that implements such user-interface components included in the dialog and supports their functionalities. In particular embodiments, a dialog may have various associated parameters, as described above. In particular embodiments, when the generated code of a dialog is delivered to the computing device so that the dialog may be presented to its user, all the original parameters associated with the dialog are encoded as hidden form fields in the HTML code. In particular embodiments, when the user interacts with specific components included in the dialog, such as clicking on a button, the HTML form is submitted, making another (i.e., a second) request to the dialog server with the same parameters as the original request for the dialog, plus additional values corresponding to the button being clicked (since buttons are form fields), plus any dialog-specific fields such as the text field in a Stream Publish dialog or the email field in a Permissions dialog if the developer asked for the email permission.

In particular embodiments, the dialog's execute( ) function handles all the logic and functionalities for all invocations of the dialog server, and needs to take into account whether the dialog is being shown for the first time or is being invoked in response to a user action performed in connection with the dialog (e.g., a button click). In particular embodiments, when a button is clicked by the user, the execute( ) function takes action and then closes the dialog, passing the result back to the caller in the GET params of the Next URL. If there's an error or if the dialog is multi-stage, then execute( ) does not call closeDialog( ), and instead ApiUIBase calls the dialog's prepareDialog( ) function, which needs to know how to render a dialog with the error or with the next stage of the dialog, which may look the same or different as previous stages.

Figure 4:
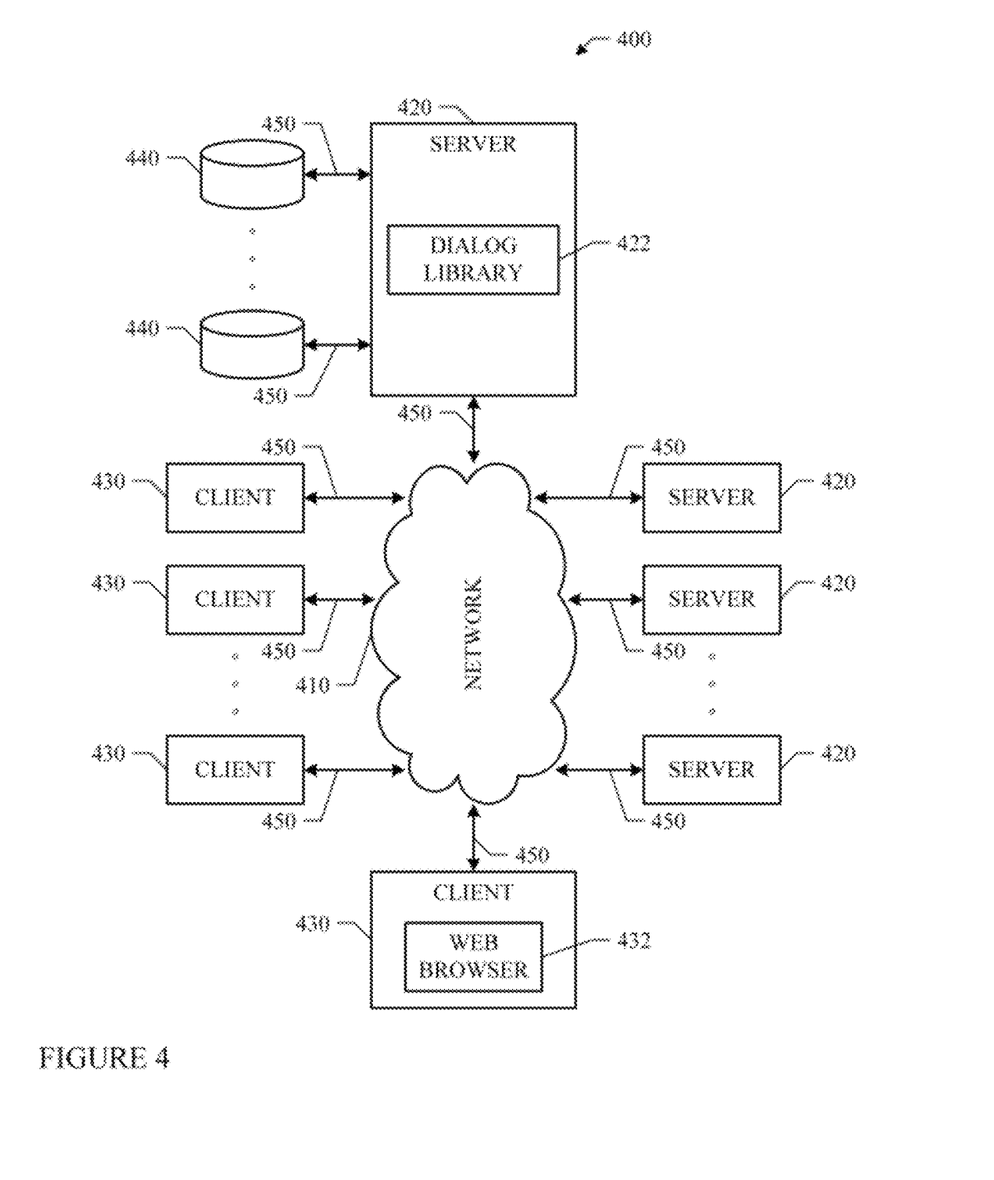
FIG. 4 illustrates an example network environment.

Particular embodiments may be implemented in a network environment. FIG. 4 illustrates an example network environment 400 suitable for providing software validation as a service. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. The present disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores. In particular embodiments, a server 420 may host a dialog library 422 and perform the functionalities supported by dialog library 422.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiment, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. The present disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
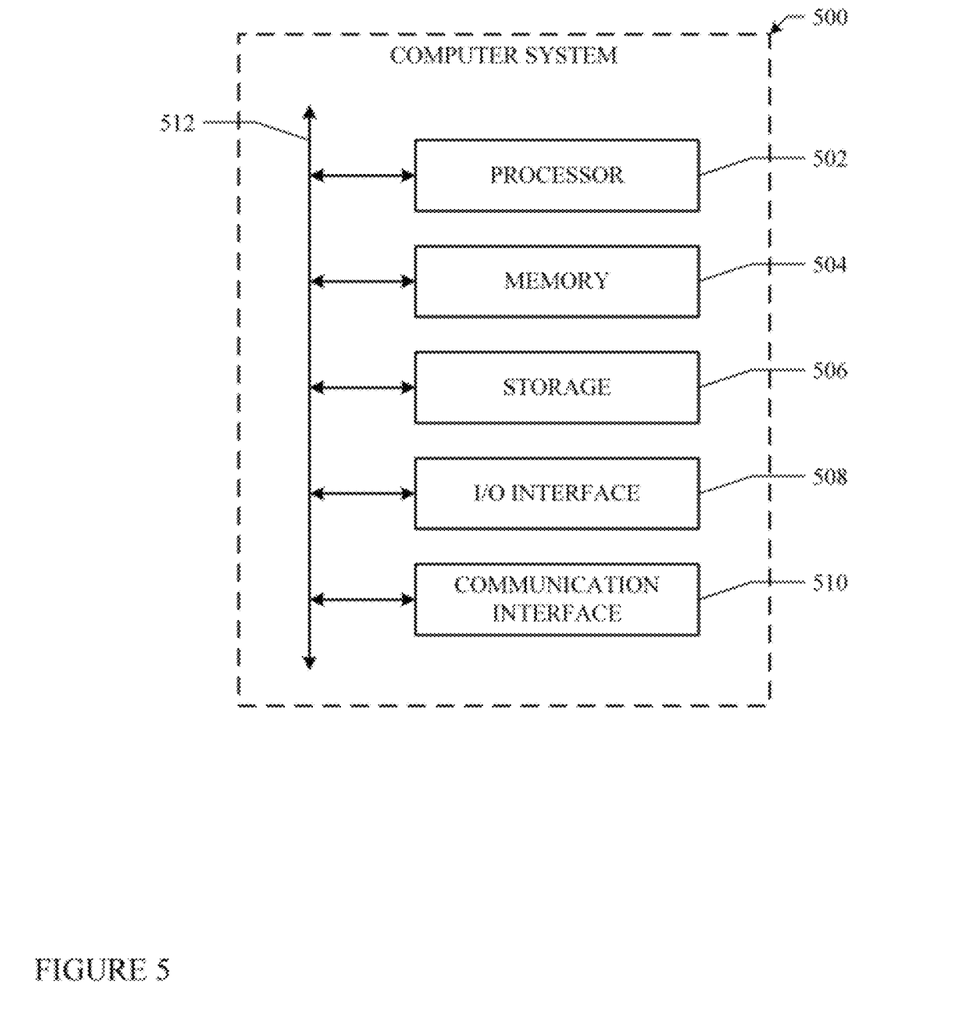
FIG. 5 illustrates an example computer system.

Particular embodiments may be implemented on one or more computer systems. FIG. 5 illustrates an example computer system 500, which may be used to implement a dialog server having a dialog library. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. The present disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them.

During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in PHP. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

APPENDIX A

An example of the HTML code generated by a dialog server in response to a request for a "stream.publish" dialog.

What is claimed is:

1. A method comprising:
receiving, at a dialog server from a client, a first request for a dialog and one or more particular parameters associated with the first request;
processing, by the dialog server, the first request and the one or more particular parameters to extract information concerning the dialog, wherein the information concerning the dialog specifies a dialog type and an application with which the dialog is associated, wherein the dialog type corresponds to at least one class in a library comprising server-side code;
invoking, by the dialog server, a method of the class;
generating, by the dialog server and based on the invoked method, a first dialog code that implements one or more functionalities supported by the dialog, wherein the first dialog code can be interpreted directly by a web browser executing on the client to display the dialog;
sending, by the dialog server to the client, the first dialog code for execution in the web browser;
receiving, at the dialog server, a second request made with respect to the dialog, wherein the second request is sent from the client in response to a specific user interaction with a component of the dialog, and wherein the second request is a modified version of the first request that comprises the one or particular parameters and one or more additional parameters corresponding to the specific user interaction; and
sending, by the dialog server to the client, a second dialog code for execution in the web server, wherein the second dialog code is based on the one or more particular parameters and the one or more additional parameters.

2. The method of claim 1, wherein the dialog type comprises a display context in which the dialog is to be displayed at the client.

3. The method of claim 1, wherein the dialog type is one of a plurality of dialog types.

4. The method of claim 3, wherein:
each dialog type of the plurality of dialog types comprises one or more components; and
the generated client-side code further implements the one or more components included in the dialog type specified by the information concerning the dialog.

5. The method of claim 1, wherein the client-side code is written in a language that can be processed directly by the web browser executing on the client.

6. The method of claim 5, wherein the client-side code is written in HyperText Markup Language (HTML).

7. The method of claim 1, wherein the client-side code, when executed in the web browser, causes the dialog to be displayed at the client.

8. A dialog server comprising:
a memory comprising instructions executable by one or more processors; and
the one or more processors coupled to the memory and operable to execute the instructions, the one or more processors being operable when executing the instructions to:
receive, from a client, a first request for a dialog and one or more particular parameters associated with the first request;
process the first request and the one or more particular parameters to extract information concerning the dialog, wherein the information concerning the dialog specifies a dialog type and an application with which the dialog is associated, wherein the dialog type corresponds to at least one class in a library comprising server-side code;
invoke, by the dialog server, a method of the class;
generate, by the dialog server and based on the invoked method, dialog code that implements one or more functionalities supported by the dialog, wherein the dialog code can be interpreted directly by a web browser executing on the client to display the dialog;

send, by the dialog server to the client, the dialog code for execution in the web browser;

receive, at the dialog server, a second request made with respect to the dialog, wherein the second request is sent from the client in response to a specific user interaction with a component of the dialog, and wherein the second request is a modified version of the first request that comprises the one or particular parameters and one or more additional parameters corresponding to the specific user interaction; and send, by the dialog server to the client, a second dialog code for execution in the web server, wherein the second dialog code is based on the one or more particular parameters and the one or more additional parameters.

9. The dialog server of claim 8, wherein the dialog type comprises a display context in which the dialog is to be displayed at the client.

10. The dialog server of claim 8, wherein the dialog type is one of a plurality of dialog types.

11. The dialog server of claim 10, wherein:
each dialog type of the plurality of dialog types comprises one or more components; and
the generated client-side code further implements the one or more components included in the dialog type specified by the information concerning the dialog.

12. The dialog server of claim 8, wherein the client-side code is written in a language that can be processed directly by the web browser executing on the client.

13. The dialog server of claim 12, wherein the client-side code is written in HyperText Markup Language (HTML).

14. The dialog server of claim 8, wherein the client-side code, when executed in the web browser, causes the dialog to be displayed at the client.

15. One or more non-transitory computer-readable tangible storage media embodying software operable when executed by a dialog server to:

receive, from a client, a first request for a dialog and one or more particular parameters associated with the first request;

process the first request and the one or more particular parameters to extract information concerning the dialog, wherein the information concerning the dialog specifies a dialog type and an application with which the dialog is associated, wherein the dialog type corresponds to at least one class in a library comprising server-side code;

invoke a method of the class;

generate, based on the invoked method, dialog code that implements one or more functionalities supported by the dialog, wherein the dialog code can be interpreted directly by a web browser executing on the client to display the dialog;

send, to the client, the dialog code for execution in the web browser; and receive a second request made with respect to the dialog, wherein the second request is sent from the client in response to a specific user interaction with a component of the dialog, and wherein the second request is a modified version of the first request that comprises the one or particular parameters and one or more additional parameters corresponding to the specific user interaction; and send, to the client, a second dialog code for execution in the web server, wherein the second dialog code is based on the one or more particular parameters and the one or more additional parameters.

16. The media of claim 15, wherein the dialog type comprises a dialog type, a display context in which the dialog is to be displayed at the client.

17. The media of claim 15, wherein the dialog type is one of a plurality of dialog types.

18. The media of claim 17, wherein:
each dialog type of the plurality of dialog types comprises one or more components; and
the generated client-side code further implements the one or more components included in the dialog type specified by the information concerning the dialog.

19. The media of claim 15, wherein the client-side code is written in a language that can be processed directly by the web browser executing on the client.

20. The media of claim 19, wherein the client-side code is written in HyperText Markup Language (HTML).

21. The media of claim 15, wherein the client-side code, when executed in the web browser, causes the dialog to be displayed at the client.

* * * * *